United States Patent [19]

Maier

[11] Patent Number: 4,679,971
[45] Date of Patent: Jul. 14, 1987

[54] ROTARY CUTTING TOOL AND PROCESS FOR MAKING SAME

[75] Inventor: Andreas Maier, Schwendi-Hörenhausen, Fed. Rep. of Germany

[73] Assignee: Hartmetallwerkzeugfabrik Andreas Maier GmbH & Co. KG, Fed. Rep. of Germany

[21] Appl. No.: 528,531

[22] Filed: Sep. 1, 1983

[30] Foreign Application Priority Data

Sep. 2, 1982 [DE] Fed. Rep. of Germany ....... 3232686

[51] Int. Cl.[4] .............................................. B23C 51/02
[52] U.S. Cl. .................................... 408/145; 408/230
[58] Field of Search ............... 408/144, 145, 230, 705, 408/59, 83; 407/118, 119; 76/101 A, 101 B, 108 T, DIG. 12

[56] References Cited

U.S. PATENT DOCUMENTS

| | | | |
|---|---|---|---|
| 1,847,302 | 3/1932 | Emmons | 408/144 |
| 1,887,372 | 11/1932 | Emmons | 408/144 |
| 2,858,718 | 11/1958 | Kohler | 408/144 |
| 2,978,846 | 4/1961 | Barron | 408/145 |
| 3,017,790 | 1/1962 | Werle | 408/144 |
| 3,085,453 | 4/1963 | Mossberg | 408/144 X |
| 3,146,561 | 1/1964 | Lindblad | 408/145 X |
| 3,751,176 | 8/1973 | Von Hollen | 408/144 |
| 4,008,976 | 2/1977 | Holzl | 408/144 |
| 4,135,847 | 1/1979 | Hemmings | 408/704 X |

FOREIGN PATENT DOCUMENTS

| | | | |
|---|---|---|---|
| 0019461 | 11/1980 | European Pat. Off. | 408/145 |
| 670370 | 12/1938 | Fed. Rep. of Germany . | |
| 1652675 | 3/1971 | Fed. Rep. of Germany | 408/144 |
| 2136271 | 1/1972 | Fed. Rep. of Germany . | |
| 2329137 | 1/1975 | Fed. Rep. of Germany . | |
| 2730912 | 1/1979 | Fed. Rep. of Germany . | |
| 2811977 | 9/1979 | Fed. Rep. of Germany . | |
| 3001875 | 7/1981 | Fed. Rep. of Germany . | |
| 1250745 | 12/1960 | France . | |
| 104093 | 8/1979 | Japan . | |
| 0005566 | 2/1980 | Japan | 408/145 |
| 66805 | 4/1982 | Japan . | |
| 2085769 | 5/1982 | United Kingdom | 408/144 |

OTHER PUBLICATIONS

West Germany: Der Maschinenbau, 1959/11, pp. 332, 333.
West Germany: TZ f. prakt. Metallbearb., 68,1974, pp. 123–125.
West Germany: VDI-Z 120, 1978, No. 24, pp. 98–99.
West Germany: Werkstattstechnik und Maschinenbau 43,1953,H.12; pp. 560–566.
West Germany: Werkstatt und Betrieb 111, 1978, pp. 449–452.
East Germany: Fertigungstechnik, 3, 1953. H.9, pp. 367, 368.
German Utility Model Application dated 12 May 1966, Inventor Erwin Stuber.
Switzerland: Technica 1969, No. 9, p. 810.
Switzerland: Technica 1962, No. 19, pp. 1405–1409.

Primary Examiner—Z. R. Bilinsky

[57] ABSTRACT

A rotary cutting tool, e.g. a drill bit, has a generally cylindrical working head consisting of ultrahard incisive material such as cubic polycrystalline diamond or boron nitride. The working head has at least peripheral cutting edges which may extend onto an adjoining carrier of hard metal secured thereto along a transverse interface; the carrier may be bonded at another junction to a tool body or may itself constitute such a body. Also disclosed is a method of making such a tool, particularly a drill with a working head of 5 mm or less, according to which a prefabricated block, consisting of interconnected ultrahard and metallic blanks for the head and its carrier, is soldered inside an aligning sleeve onto a cylindrical extension of the tool body whereupon the extension and the block are jointly machined to form the tool.

19 Claims, 20 Drawing Figures

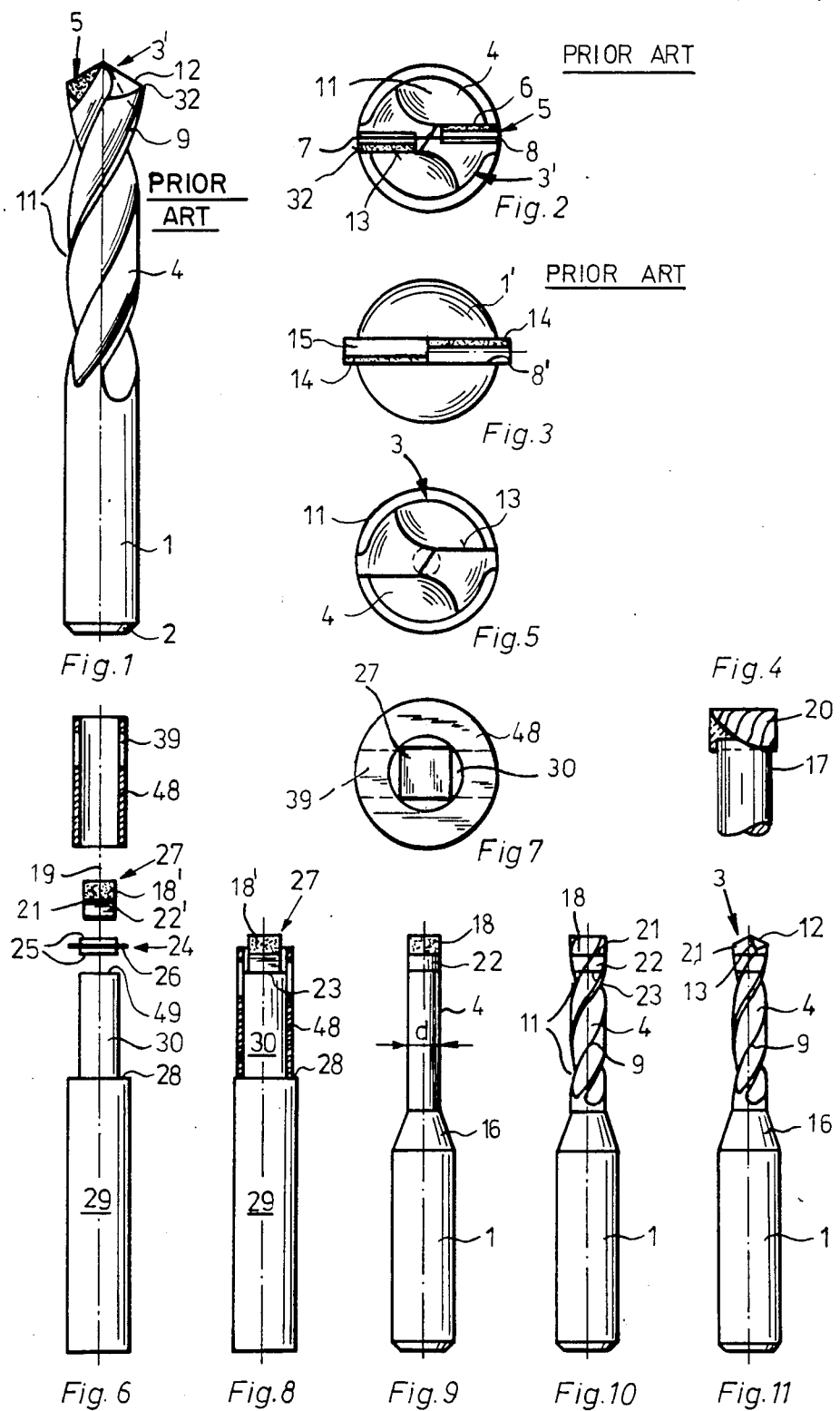

ROTARY CUTTING TOOL AND PROCESS FOR MAKING SAME

FIELD OF THE INVENTION

My present invention relates to a rotary cutting tool, e.g. a drill bit, and to a process for manufacturing such a tool.

BACKGROUND OF THE INVENTION

Tools of the type here considered, designed for drilling, milling, grinding or countersinking, have generally cylindrical working heads with lateral cutting edges on their peripheral surfaces and often, particularly in the case of drill bits, frontal cutting edges on an end face. The lateral cutting edges, which may extend in an axial direction or along helical lines, are separated by flutes codirectional therewith which serve to carry off the chips removed from a workpiece.

In the specific instance of a drill bit, the frontal cutting edges and the corners formed at their junctions with the lateral cutting edges constitute the most severely stressed parts of the tool. It is therefore desirable to make at least these front edges of the hardest and toughest material available. Such materials, developed relatively recently, are ultrahard polycrystalline incisive substances, specially cubic diamond (PCD) and cubic boron nitride (CBN). The use of these materials facilitates machining operations at higher speeds and of better quality than was previously possible, besides lengthening the service life of the tools.

Another advantage, in comparison with monocrystalline cutting materials utilized in tools of earlier vintage, is the greater freedom in the geometrical orientation of the cutting edges since they no longer have to lie in a predetermined position relative to the crystal structure. The polycrystalline materials referred to are suitable, inter alia, for machining workpieces provided with inserts of highly refractory character such as glass-fiber-reinforced conductor plates.

Unfortunately, these ultrahard substances are expensive and are therefore used sparingly in the most highly stressed parts of a tool. Moreover, polycrystalline diamonds have limited thermal stability and for this reason are used mainly with nonferrous metals and synthetic resins whereas workpieces of iron and steel are preferentially machined with the less temperature-sensitive CBN. In the case of drill bits, it is the practice to insert narrow ultrahard blades in pockets on the end faces of the tool bodies, generally made of hard metal, to provide the frontal cutting edges thereof; the blades are soldered to the tool body and are then machined jointly with the latter to form the drill head. Owing to the limited and irregular contact area between these narrow blades and the surrounding metal, the heat generated in a cutting operation is dissipated rather slowly and in a nonuniform manner by the tool body and its mounting so that local thermal stresses can arise. These stresses may initiate or reinforce undesirable vibrations which would impair the quality of the surface being machined. Finally, the handling and positioning of such blades becomes impractical with tools whose end faces have diameters of less than 5 mm.

OBJECTS OF THE INVENTION

An important object of my present invention, therefore, is to provide an improved rotary cutting tool which more effectively utilizes the incisive properties of the polycrystalline materials referred to while obviating the drawbacks discussed above.

A more particular object is to provide a drill bit of this character which can be produced with diameters of less than 5 mm.

A related object of my invention is to provide a process for expeditiously manufacturing such tools, especially drill bits.

SUMMARY OF THE INVENTION

A rotary cutting tool according to my invention comprises, essentially, an elongate metallic member centered on an axis and a generally cylindrical working head coaxially secured to one end of that member along a generally transverse interface extending over its entire cross-sectional area, this working head being provided along its periphery with a plurality of lateral cutting edges and consisting in its entirety of a ultrahard polycrystalline incisive material as discussed above.

Generally, the incisive working head can be fastened to its supporting metallic member in a variety of ways, e.g. with a peripheral overhang to form a cap partly surrounding that member. This will do in the case of a milling head, grinding disk or other tool whose peripheral cutting edges are limited to a narrow axial zone adjoining its free end. In other instances, especially in the case of a drill bit, I prefer to make the working head flush with an adjoining—usually cylindrical—portion of the metallic member onto whose periphery the lateral cutting edges are extended past the intervening interface. This adjoining portion may be an integral part of the tool body or may be an intermediate metallic carrier which can be permanently joined to the working head as an extension thereof, possibly at the place of manufacture of a blank for that working head and which can then be soldered or otherwise attached to the tool body proper in a relatively simple manner.

In any event, the full-face contact between the working head and its metallic support insures rapid and uniform heat dissipation throughout the corss-sectional area of that support so as to minimize localized thermal stresses and prevent deformations of the cutting edges. The smooth transition between the working head and its support of less expensive material, such as hard metal, enables the formation of cutting edges and flutes on their common periphery in a continuous operation.

I have found that, notwithstanding a prejudice prevailing in the art, such a full-surface working head of polycrystalline ultrahard material does not undergo objectionable torsional deformation during the machining of a workpiece, especially in the case of drill heads with diameters of about 4 mm or less. On the contrary, the uniform crystalline structure of that head improves its cutting ability and produces cleaner workpiece surfaces. The service life of the head is greatly increased as the cutting edges need to be reground much less frequently. With automatic monitoring of edge sharpness and regrinding control, for example, a diamond (PCD) head according to my invention will last about 100 times as long as one made of hard metal. While the edges and flutes of such a diamond head can be ground only with implements of comparable hardness, e.g. liquid-cooled wheels comprising diamond particles embedded in a highly heat-conductive metal such as copper or silver, this operation will be quite simple in the case of drill bits of the size referred to which do not require deep radial penetration by the grinders.

A firm permanent bonding of the working head to its metallic support can be achieved through the creation, at their interface, of a zone of interpenetration of the crystal lattice of the head by the metal of the support or of an intervening layer of solder. The latter type of interpenetration can be obtained by soldering under vacuum. The working head could also be directly anchored to its support, again with metallic interpenetration of its crystal lattice, by being partly crystallized onto the support itself in the course of its manufacture.

When the supprt is an intermediate working-head carrier, it can be soldered in turn to the tool body proper—e.g. in a protective gas atmosphere—under conditions designed to prevent a heating of the incisive material above the limit of its thermal stability. That limit lies around 700° C. in the case of PCD and around 1600° C. in the case of CBN. If the intermediate carrier is a rod of significant axial length, substantially exceeding that of the working head, no particular precautions may be necessary. In such a case, moreover, the junction between the rod and the tool body can be curved, stepped or inclined so as to deviate from a plane transverse to the rod axis, thereby increasing the area of contact along which thermal or adhesive bonding is to take place. If necessary, the contact surfaces may be roughened to insure positive interfitting. It is also possible to thermally shrink a hollow part of the tool body around an end of the rod remote from the working head.

In manufacturing a rotary cutting tool according to my invention, a prefabricated block consisting at least in part of a slug made from the aforedescribed ultrahard incisive material is juxtaposed with a cylindrical extremity of a metallic tool body which is centered on an axis of the block and has a diameter substantially equal to the largest transverse dimension of the latter. The block, which could be cylindrical or prismatic, should be so positioned that a free end of its ultrahard slug faces away from the extremity of the tool body to which the block is to be joined. After their joinder, by one of the various methods mentioned above, the block and the tool-body extremity are jointly machined to be given a common peripheral surface with a plurality of lateral cutting edges which are bounded by helical flutes and are formed at the free end of the slug by the incisive material thereof.

Thus, the ultrahard slug constitutes a blank which is being shaped into the working head of the tool. In many instances it will be desirable to bond that slug in the course of its manufacture, e.g. by direct crystallization, to a second blank made of hard metal and serving to form the intermediate carrier already mentioned. The latter blank can then be soldered to the adjoining extremity of the tool body, care being taken to prevent overheating of the first blank (i.e. the ultrahard slug) as noted heretofore. When the second blank is short, excessive slug temperatures may be avoided by heating its junction with the tool-body extremity exclusively by way of that extremity and with concurrent cooling of the slug itself. Soldering may take place, advantageously, inside a sleeve aligning that extremity with the prefabricated block while exposing the top of the abrasive slug to the action of a cooling fluid also serving to urge the block onto that extremity to produce a firm bond. Since it may be difficult to obviate a soldering of the sleeve itself to the tool body, the sleeve may be sacrificed by being ground off in the course of the subsequent joint machining of the interconnected elements.

BRIEF DESCRIPTION OF THE DRAWINGS

The above and other features of my invention will now be described in detail with reference to the accompanying drawing in which:

FIG. 1 is a side view of a conventional drill bit with inserted incisive blades;

FIG. 2 is an end view of the drill bit shown in FIG. 1;

FIG. 3 is an end view of a blank for a similar conventional drill bit;

FIG. 4 is a fragmentary side view of a rotary cutting tool embodying my invention;

FIG. 5 is an end view similar to FIG. 2 but showing a drill bit according to my invention;

FIG. 6 is an exploded side view, partly in section, if an assembly for making a drill but such as that shown in FIG. 5;

FIG. 7 is an end view similar to that of FIG. 5, showing the asssembly of FIG. 6 as seen from the top;

FIGS. 8, 9, 10 and 11 are side views similar to FIG. 6, showing successive steps in transforming that assembly into my improved drill bit;

SPECIFIC DESCRIPTION

Figure 13:
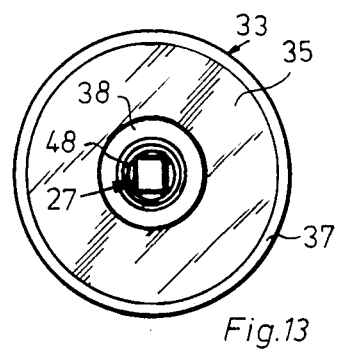
FIG. 13 is a top view corresponding to that of FIG. 7 but taken on the line XIII—XIII of FIG. 12.

FIGS. 1 and 2 show a prior-art drill bit comprising a shank 1 of tool steel integral with a grooved stem 4 which terminates in a pointed top 3' with a generally conical surface 12. The stem 4 of this tool is formed with helically extending lateral cutting edges 9 separated by flutes 11; these lateral edges 9 merge at corners 32 into respective oppositely facing frontal edges 13 formed by flat blades 5 that are inserted into generally radial pockets 8 and consist of ultrahard polycrystalline material of the type described above, such as cubic diamond (PCD) or boron nitride (CBN). Each blade 5, soldered in position within its pocket, comprises a backing strip 7 with an incisive coating 6 forming the respective cutting edge 13. Shank 1 has an end 2 grippable by a chuck.

As illustrated in FIG. 3, a preform 1' designed to be shaped into a drill bit similar to that of FIGS. 1 and 2 may be conventionally provided with a diametrically extending pocket 8' accommodating two mutually abutting cutter blades each comprising a backing strip 15 with an incisive coating 14 designed to form a respective frontal cutting edge 13 after machining of the preform to provide the lateral cutting edges 9 and the flutes 11 of FIG. 1.

In FIG. 4 I have shown the upper end of a rotary cutting tool embodying my invention, specifically a miller with a steel shank 17 and an incisive working head 20 fitted as a cap around the top of that shank. The head 20 may have been shaped from a blank of larger diameter formed by a growth of PCD or CBN crystals around the upper end of the shank. The tool has helicoidal flutes defining lateral cutting edges which in this instance extend only over the periphery of head 20.

FIG. 5 shows the top face of a working head 3 which differs from the corresponding face 3' of FIGS. 1 and 2 by lacking the pockets 8 with their inserts 5 while having the same structural configuration, i.e. frontal cutting edges 13 merging at corners 32 into lateral cutting edges 9 (see FIG. 11) bounded by flutes 11 on a stem 4. Such an improved drill bit can be conveniently manufactured in a series of steps described hereinafter with reference to FIGS. 6-13.

Thus, as shown in FIGS. 6 and 7, a solid block 27 in the form of a four-sided regular prism is prefabricated by joining a slug 18' of the aforedescribed polycrystalline incisive material, serving as a blank for a working head, to a base 22' of tool steel or the like, serving as a blank for an intermediate carrier, along an interface 21 transverse to an axis 19. The two blanks 18' and 22', which have identical square outlines and similar axial lengths, are bonded to each other, e.g. by metallic interpenetration under vacuum or crystalline growth as already described, during manufacture of the block 27. The latter is then coaxially aligned with a tool-body preform 29 having a reduced cylindrical extremity 30, preferably of the same hard metal as blank 22'. The latter blank confronts an end face 49 of extremity 30 to which it is to be soldered; a soldering foil 24 is interposed for this purpose between members 27 and 30, this foil preferably comprising two solder layers 25 on opposite sides of a wafer 26 consisting of a highly heat-conductive metal, preferably copper. The diameter of member 30 substantially equals or slightly exceeds the diagonal of block 27 as seen in FIG. 7.

Figure 12:
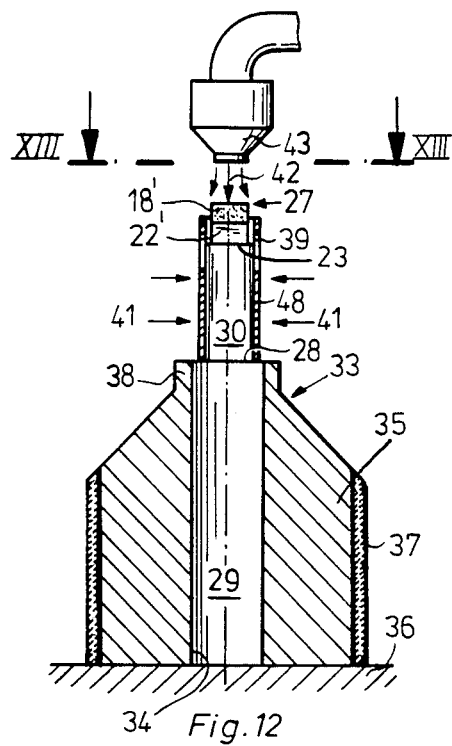
FIG. 12 is a side view of the assembly of FIG. 6 mounted in a holder for the performance of a soldering operation.

A guide sleeve 48, fitting closely around extremity 30, is initially placed on a shoulder 28 separating that extremity from the shank of preform 29. Sleeve 48 has windows 39 (FIG. 12) through which the foil 24 is introduced before the block 27 is deposited thereon with the top of slug 18' projecting from the sleeve as seen in FIGS. 8 and 12. The blank 29 is received at this stage in a bore 34 of a metallic holder 33, serving as a heat sink, which rests on a massive metallic work table 36 and has an enlarged lower part 35 enclosed in a thermally insulating shell 37. A nozzle 43 overlying that assembly trains a flow 42 of cooling air upon the exposed top of block 27 whereby the block is pressed against the metallic member 30 through the intermediary of foil 24 which has been indicated only by a junction 23 in FIGS. 8 and 12. Heat is applied, as indicated by arrows 41, via the metallic sleeve 48 to member 30 for fusing the solder to bond the blank 22' to that member by way of the heat-conducting wafer 26 interposed therebetween. Thanks to the cooling effect of the air stream 42 and the separation of the heating zone from slug 18', the latter does not reach a temperature at which its incisive material might be subjected to thermal stresses of transformation. The assembly of FIG. 12, without nozzle 43, is seen from above in FIG. 13.

When soldering is completed, the interconnected components 29, 22' and 18' are machined to form the structure of FIG. 9 which includes a tool body with a shank 1 tapering frustoconically at 16 toward a stem 4 whose diameter d equals that of a carrier 22 and a working head 18, respectively derived from the two solid blanks 22' and 18' which in the same operation have been shaped cylindrical. Further machining leads to the configuration of FIG. 10 in which the head 18 and its carrier 22 have been provided with helical cutting edges 9 bounded by flutes 11. FIG. 11, already referred to, shows the product of a final machining operation in which the end face 12 of head 21 is given a conical shape and is provided with frontal cutting edges 13 merging into the lateral cutting edges 9.

Figure 14:
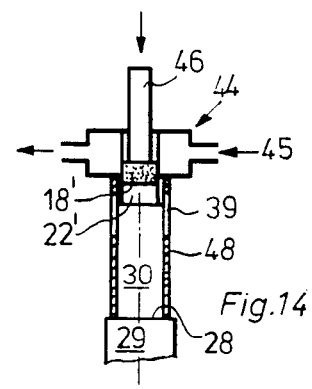
FIG. 14 is a fragmentary and somewhat diagrammatic, partly sectional side view illustrating a modification of the assembly of FIG. 12.

FIG. 14 shows a modification of the assembly of FIG. 12 according to which the projecting top of blank 18' is surrounded by a hollow ring 44 carrying a cooling fluid 45; soldering pressure is here exerted upon the block 27 by a plunger 46.

The sleeve 48 will generally not be reusable since it is adhered to the metallic member 30 by the solder of foil 24. It is therefore ground off in the operation leading to the structure of FIG. 9.

When the flutes 11 are formed with the aid of coarse-grained grinding wheels of the type referred to above, the initial advance across junctions 21 and 23 ought to be in small steps. Thereafter, however, the finishing of the flutes 11 and the cutting edges 9 can be carried out quite rapidly in sustained strokes along the entire peripheral surface of parts 4, 22 and 21. These parts should, however, be braced against vibration.

Figures 15, 16, 17, 18, 19, 20:
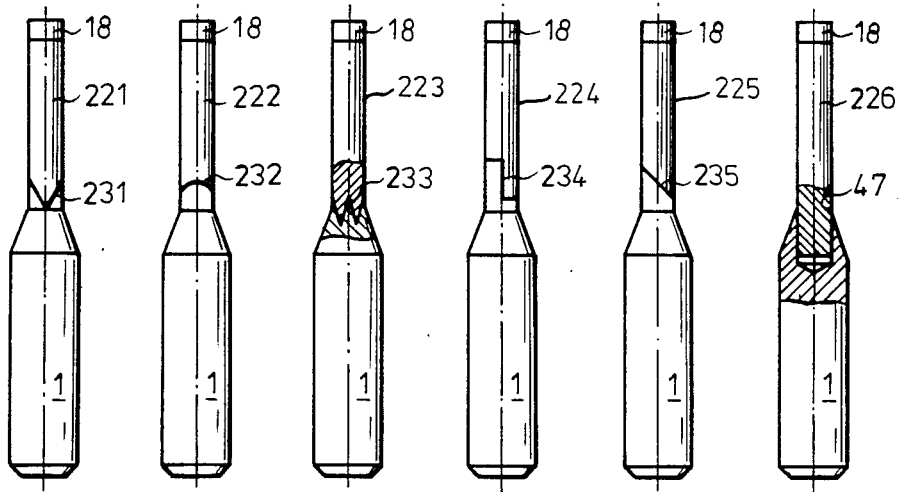
FIGS. 15-20 are views similar to FIG. 9 but illustrating a variety of tool blanks formed from assemblies similar to that of FIG. 6.

In FIGS. 15-20 I have illustrated various ways in which a stem of greater axial length, respectively designated 221-226, can be attached to a shank 1 of a tool body after having been joined in the aforedescribed manner to a cylindrical working head 18 of polycrystalline incisive material. According to FIGS. 15, the two parts are bonded together at a wedge-shaped junction 231. In FIG. 16 a part-cylindrical junction 232 is provided. FIG. 17 shows a junction 233 of serrated sectional profile whose lower surface is formed by a central cone and a surrounding ridge. FIG. 18 illustrates a stepped junction 234. FIG. 19 shows a flat but sloping junction 235. FIG. 20 illustrates a bore 47 in shank 1 into which the lower end of stem 226 is inserted while the shank is heated so as to be subsequently shrunk tightly around that stem.

The configurations of junctions 231 and 232 are also representative of sectional profiles of rotationally symmetrical surfaces which are conical in the first instance and part-spherical in the second instance. Mating formations of the mortise-and-tenon type could likewise be used.

The enlarged contact surfaces present at junctions 231-235 allow the use of cold-setting heat-resistive adhesives for a secure interconnection. Soldering under a protective atmosphere, e.g. as conventionally used for the cutter blades of FIGS. 1-3, or other thermal bonding (e.g. friction welding) can be used at such junctions if the working heads 18 are sufficiently remote therefrom and/or consist of a substance such as CBN able to withstand relatively elevated temperatures.

I claim:
1. A rotary cutting tool comprising:
a metallic member centered on an axis;
a generally cylindrical working head consisting in its entirety of an ultrahard polycrystalline incisive material of polycrystalline diamond or cubic boron-nitride and coaxial with and bonded to one end of said metallic member by metallic interpenetration under vacuum or crystalline growth along a generally transverse interface extending over the entire cross-sectional area of said metallic member;
a tool body; and
a junction separating said elongate metallic member from the tool body and axially spaced from said interface, said junction being preformed from a foil comprising two solder layers on opposite sides of a highly heat-conductive metal wafer, said working head having an end face with at least one frontal cutting edge and a flute for guiding away workpiece chips cut out by said cutting edge, the flute being formed in the working head through said interface into said metallic member and extending at least generally axially past said interface onto an adjoining portion of said elongate metallic member.

2. The cutting tool defined in claim 1 wherein said adjoining portion is cylindrical and of the same diameter as said working head.

3. The cutting tool defined in claim 2 wherein said adjoining portion is a rod substantially exceeding said working head in axial length.

4. The cutting tool defined in claim 3 wherein said junction deviates from a plane transverse to said axis.

5. The cutting tool defined in claim 2 wherein said lateral cutting edges extend past said junction onto a cylindrical part of said tool body having the same diameter as said adjoining portion and said working head.

6. The cutting tool defined in claim 1 wherein said working head and said adjoining portion form a drill bit with helicoidal flutes bounding said lateral cutting edges, said working head having a conical tip provided with frontal cutting edges.

7. The cutting tool defined in claim 6 wherein said drill bit has a diameter of less than 5mm.

8. The cutting tool defined in claim 1 wherein said working head forms a cap partly surrounding said adjoining portion.

9. A rotary tool comprising:
a metallic member centered on an axis;
a generally cylindrical working head consisting in its entirety of an ultrahard incisive material of polycrystalline diamond or cubic boron-nitride and coaxial with said metallic member; and
means for bonding the working head to one end of the member along a generally transverse interface extending over the cross-sectional area of said metallic member, said working head having an end face with at least one frontal cutting edge and a helicoidal lateral edge, the member, head, and junction being formed with a spiral flute for guiding workpiece chips away from said cutting edges, the flute being ground smoothly through said interface into said metallic member and into said head.

10. A rotary cutting tool comprising:
a metallic member centered on an axis;
a generally cylindrical working head consisting in its entirety of an ultrahard incisive material of polycrystalline diamond or cubic boron-nitride and coaxial with said metallic member; and
means for bonding the head to one end of the member along a generally transverse interface extending over the cross-sectional area of said metallic member, said working head being provided with at least one frontal cutting edge, the head, member, and junction being formed with a helicoidal lateral cutting edge with a flute for guiding workpiece chips away from the cutting edges in the main direction of said axis, the flutes being ground smoothly through said interface into said metallic member and into said working head.

11. A rotary cutting tool comprising:
a metallic member centered on an axis;
a generally cylindrical working head consisting in its entirety of an ultrahard incisive material of polycrystalline diamond or cubic boron-nitride and coaxial with said metallic member;
means for bonding the head to the member at one end thereof along a generally transverse interface extending over the cross-sectional area of said metallic member;
a tool body; and
a junction between an opposite end of said metallic member and the tool body, said working head being provided with frontal cutting edges meeting in corners with helicoidal lateral cutting edges and with a spiral flute for guiding workpiece chips at least generally axially away from the cutting edges, the flutes being formed out of said working head and ground through said interface at least into said metal member.

12. The cutting tool defined in claim 11 wherein said metallic member is a rod substantially exceeding said working head in axial length, the junction having a layer of metal with good heat-transferring properties and a melting point below the transferring temperature of the working head.

13. The cutting tool defined in claim 12 wherein said junction deviates from a plane transverse to said axis.

14. The cutting tool defined in claim 13 wherein said adjoining portion is separated from said tool body and said junction by a highly heat-conductive foil.

15. The cutting tool defined in claim 11 wherein said lateral cutting edges extend past and said flutes extend through said junction onto a cylindrical part of said tool body having the same diameter as said adjoining portion of said working head.

16. The cutting tool defined in claim 11 wherein said working head and said metallic member form a drill bit, and working head having a conical tip.

17. The cutting tool defined in claim 16 wherein said drill bit has a diameter of less than 5mm.

18. The cutting tool defined in claim 11 wherein said working head forms a cap partly surrounding said adjoining portion.

19. A rotary cutting tool comprising:
an elongate metallic member centered on an axis;
a generally cylindrical working head consisting in its entirety of an ultrahard
polycrystalline incisive material, coaxial with said member, and bonded together by metallic interpenetration
under vacuum or crystalline growth to one end of the member along a generally transverse interface extending over the entire cross-sectional area of said member;
a tool body; and
a junction separating said elongate metallic member axially from the tool body and axially spaced from said interface, said junction being preformed from a foil comprising two solder layers on opposite sides of a highly heat-conductive metal wafer, said working head being provided along its periphery with a plurality of lateral cutting edges extending at least generally axially past said interface onto an adjoining portion of said elongate metallic member.

* * * * *